United States Patent
Kurosaka (10) Patent No.: US 8,811,702 B2
(45) Date of Patent: Aug. 19, 2014

(54) OPTICAL COHERENCE TOMOGRAPHIC IMAGING APPARATUS, OPTICAL COHERENCE TOMOGRAPHIC IMAGING METHOD, PROGRAM FOR EXECUTING THE OPTICAL COHERENCE TOMOGRAPHIC IMAGING METHOD, AND STORAGE MEDIUM HAVING THE PROGRAM STORED THEREON

(75) Inventor: Ryoji Kurosaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 165 days.

(21) Appl. No.: 13/482,154

(22) Filed: May 29, 2012

(65) Prior Publication Data

US 2013/0003074 A1 Jan. 3, 2013

(30) Foreign Application Priority Data

Jun. 29, 2011 (JP) ................... 2011-143919

(51) Int. Cl.
*G06K 9/00* (2006.01)
*G01B 9/02* (2006.01)

(52) U.S. Cl.
CPC ...................................... *G01B 9/02* (2013.01)
USPC .......................................... 382/128; 356/479

(58) Field of Classification Search
USPC .......... 382/128, 130–132, 154; 356/479, 450, 356/477, 478, 497
See application file for complete search history.

(56) References Cited

U.S. PATENT DOCUMENTS

| 8,204,300 | B2 * | 6/2012 | Sugita et al. ................. 382/154 |
| 2011/0007321 | A1 * | 1/2011 | Everett et al. ................ 356/479 |
| 2011/0202044 | A1 * | 8/2011 | Goldshleger et al. ............ 606/4 |
| 2012/0099076 | A1 |  4/2012 | Kurosaka |

OTHER PUBLICATIONS

D.M. Stein, et al., "A new quality assessment parameter for optical coherence tomography", British Journal of Ophthalmology, Feb. 2006, vol. 90, pp. 186-190.
Y. Imamura, et al., "Enhanced Depth Imaging Optical Coherence Tomography of the Choroid in Central Serous Chorioretinopathy", Retina, The Journal of Retinal and Vitreous Diseases, Nov./Dec. 2009, vol. 29, No. 10, pp. 1469-1473.

* cited by examiner

*Primary Examiner* — Yon Couso
(74) *Attorney, Agent, or Firm* — Fitzpatrick, Cella, Harper & Scinto (57) ABSTRACT

In order to perform accurate evaluation for enhanced depth imaging (EDI) in which a tomographic image of a retina has a low luminance value in large part, provided is an optical coherence tomographic imaging apparatus for acquiring an image of an object to be inspected by irradiating the object to be inspected with measuring light and causing return light from the object to be inspected to interfere with reference light, the optical coherence tomographic imaging apparatus including: a unit for setting an imaging parameter of the image; a unit for selecting an image quality evaluation index in accordance with the imaging parameter; a unit for acquiring an image characteristic amount from the acquired image in accordance with the set imaging parameter; and a unit for evaluating image quality of the image based on the image characteristic amount and the image quality evaluation index.

12 Claims, 7 Drawing Sheets

OPTICAL COHERENCE TOMOGRAPHIC IMAGING APPARATUS, OPTICAL COHERENCE TOMOGRAPHIC IMAGING METHOD, PROGRAM FOR EXECUTING THE OPTICAL COHERENCE TOMOGRAPHIC IMAGING METHOD, AND STORAGE MEDIUM HAVING THE PROGRAM STORED THEREON

BACKGROUND OF THE INVENTION

1. Field of the Invention

The present invention relates to an optical coherence tomographic imaging apparatus and an optical coherence tomographic imaging method. In particular, the present invention relates to an optical coherence tomographic imaging apparatus and an optical coherence tomographic imaging method for acquiring a tomographic image of an eye fundus, a skin, and the like by optical coherence tomography, and to a program for executing the optical coherence tomographic imaging method and a storage medium having the program stored thereon.

2. Description of the Related Art

In recent years, an optical coherence tomographic imaging apparatus (optical coherence tomography apparatus: hereinafter, referred to as "OCT apparatus") that employs an optical interference technology utilizing low-coherent light has been put into practical use. The OCT apparatus is an apparatus that is useful in a medical field, in particular, in an ophthalmologic field. The OCT apparatus is capable of acquiring a tomographic image of a portion of a retina in an eye fundus, and has therefore gradually been regarded as an apparatus indispensable for diagnosing illnesses in an eye fundus portion.

The principle of the OCT apparatus is briefly described. Low-coherent light is divided into reference light and measuring light. The measuring light is caused to enter an object to be inspected, and return light, which is reflected from an area to be imaged as a tomographic image, is caused to interfere with the reference light, with the result that a tomographic image of the object to be inspected can be acquired. The OCT apparatus is classified into two types, that is, a time domain (TD) type and a Fourier domain (FD) type. The FD-OCT apparatus determines a reflection intensity profile with respect to a distance (depth) by performing Fourier transform for an acquired interference signal with respect to a wavenumber. Through scanning of an irradiated portion of the object to be inspected, the tomographic image can be acquired. The FD-OCT apparatus can acquire the tomographic image at higher speed as compared to the TD-OCT apparatus, and hence the FD-OCT apparatus has become the current mainstream.

As a method of image quality evaluation for the OCT tomographic image, for example, there are provided graininess evaluation using a signal-to-noise ratio (SNR), a contrast-to-noise ratio (CNR), and a Wiener spectrum, and resolution evaluation using a modulation transfer function (MTF). Those indices are physical indices focusing on part of the image quality.

On the other hand, as an evaluation index reflecting the subjectivity of end users (for example, doctor and clinical technologist), a quality index (QI) is disclosed in D. M. Stein, J. G. Fujimoto, et al. Br. J. Ophthalmol. 2006 February; 90(2): 186-190. The QI is an image quality evaluation index determined based on a histogram for a luminance value of an image, and it is reported that the QI has a higher correlation with the evaluation of the end users as compared to the physical indices such as the SNR.

Figure 8:
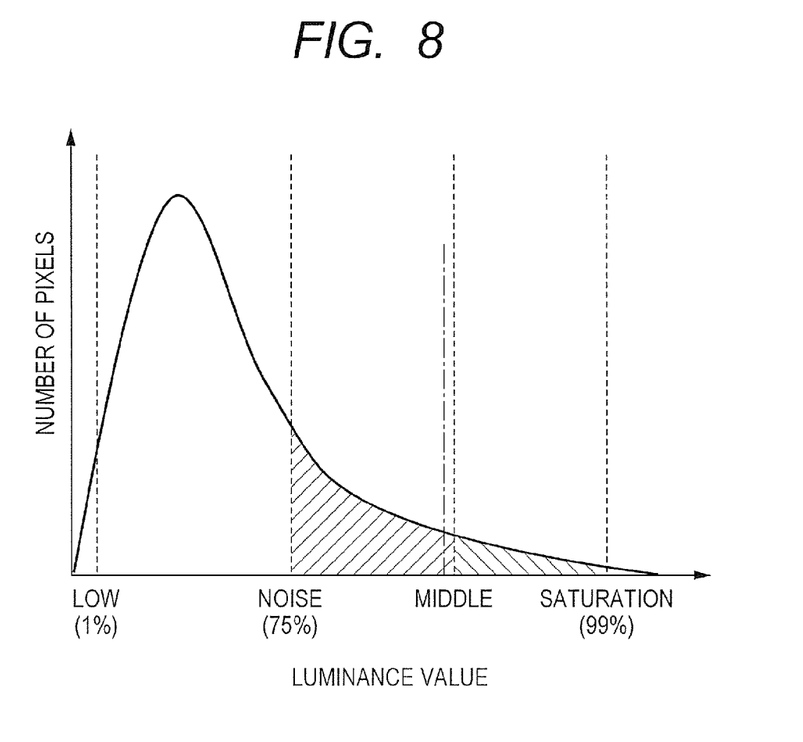
FIG. 8 is an illustration of a histogram showing a QI described in D. M. Stein, J. G. Fujimoto, et al. Br. J. Ophthalmol. 2006 February; 90(2): 186-190.

FIG. 8 is an illustration of a histogram showing the QI. The QI is expressed by the following expressions.

$$QI = IR \times TSR \quad \text{(Expression 1.1)}$$

$$IR = \frac{(\text{Saturation} - \text{low})}{\text{Low}} \times 100 \quad \text{(Expression 1.2)}$$

$$TSR = \frac{\text{Number(Saturation} \sim \text{Middle})}{\text{Number(Middle} \sim \text{Noise})} \quad \text{(Expression 1.3)}$$

Note that, in D. M. Stein, J. G. Fujimoto, et al. Br. J. Ophthalmol. 2006 February; 90(2): 186-190, "Saturation", "Low", "Noise", and "Middle" are defined as follows.
Saturation: 99th percentile of the histogram
Low: 1st percentile of the histogram
Noise: 75th percentile of the histogram
Middle: average value between "Saturation" and "Noise"

"Number(Saturation~Middle)" represents the total number of pixels having a luminance value in a range of from "Saturation" to "Middle" in the histogram. "IR" is a term corresponding to the signal-to-noise ratio (SNR), and "TSR" represents, as shown in FIG. 8, a ratio of the number of pixels in a bright layer to the number of pixels in a dark layer.

Further, as one of the OCT imaging methods in ophthalmology, imaging using an enhanced depth imaging (hereinafter, referred to as "EDI") method is known. The EDI method is a method to be used mainly for observing details of a choroid with a focus on a relationship between the choroid and the illness. The EDI method is a method of acquiring a tomographic image as a reverse image under a state in which a position of a coherence gate is situated more deeply than the position of the choroid. The coherence gate represents a position at which the optical distances of the measuring light and the reference light in the OCT apparatus are equal to each other.

In recent years, as described in, for example, IMAMURA, YUTAKA et al. Retina, Vol. 29, pp. 1469-1473 (2010), studies on the choroid thickness of affected eyes have been proceeding, and hence the significance of diagnosing the choroid has been increasing.

The choroid is a layer which is low in luminance (low in regular reflectance), and hence, as a portion of the retinal image which has a low luminance value is rendered with higher accuracy, the user can diagnose the choroid with higher accuracy. However, the image quality evaluation index described in D. M. Stein, J. G. Fujimoto, et al. Br. J. Ophthalmol. 2006 February; 90(2): 186-190 is not appropriate as an index for evaluating the image quality of an image acquired by the EDI method because the rendering of a portion of the image which has a high luminance value is rated high.

SUMMARY OF THE INVENTION

It is an object of the present invention to perform more appropriate image quality evaluation.

Further, it is another object of the present invention to acquire a more appropriate image through readjustment performed based on a result of the image quality evaluation.

According to an exemplary embodiment of the present invention, there is provided an optical coherence tomographic imaging apparatus for acquiring a tomographic image of an object to be inspected based on combined light of return light from the object to be inspected and reference light, the return light being obtained by irradiating the object to be inspected with measuring light, the reference light corresponding to the measuring light, the optical coherence tomographic imaging apparatus including: an imaging parameter setting unit for setting an imaging parameter of the tomographic image of the object to be inspected; an evaluation index selection unit for selecting an image quality evaluation index in accordance with the imaging parameter; an image characteristic amount acquiring unit for acquiring an image characteristic amount from the tomographic image in accordance with the imaging parameter; and an image quality evaluating unit for evaluating image quality of the tomographic image based on the image characteristic amount and the image quality evaluation index.

Further, according to an exemplary embodiment of the present invention, there is provided an optical coherence tomographic imaging method for acquiring an image of an object to be inspected by dividing light emitted from a light source into reference light and measuring light, irradiating the object to be inspected with the measuring light, and by causing return light from the object to be inspected to interfere with the reference light, the optical coherence tomographic imaging method including: setting an imaging parameter of the image; selecting an image quality evaluation index in accordance with the imaging parameter; acquiring an image characteristic amount from the acquired image in accordance with the set imaging parameter; and evaluating image quality of the image based on the image characteristic amount and the image quality evaluation index.

According to the present invention, it is possible to perform more appropriate image quality evaluation through the selection of the image quality evaluation index in accordance with the imaging parameter.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
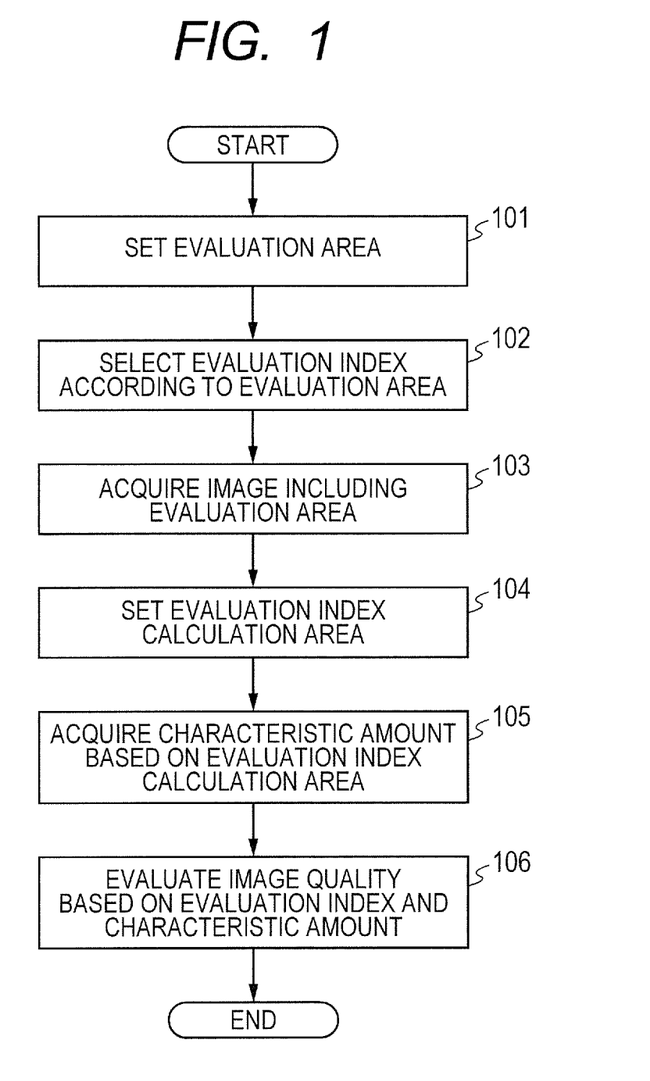
FIG. 1 is a flow chart illustrating a first embodiment of the present invention.

A first embodiment of the present invention is described with reference to FIGS. 1 to 3.

Figure 2:
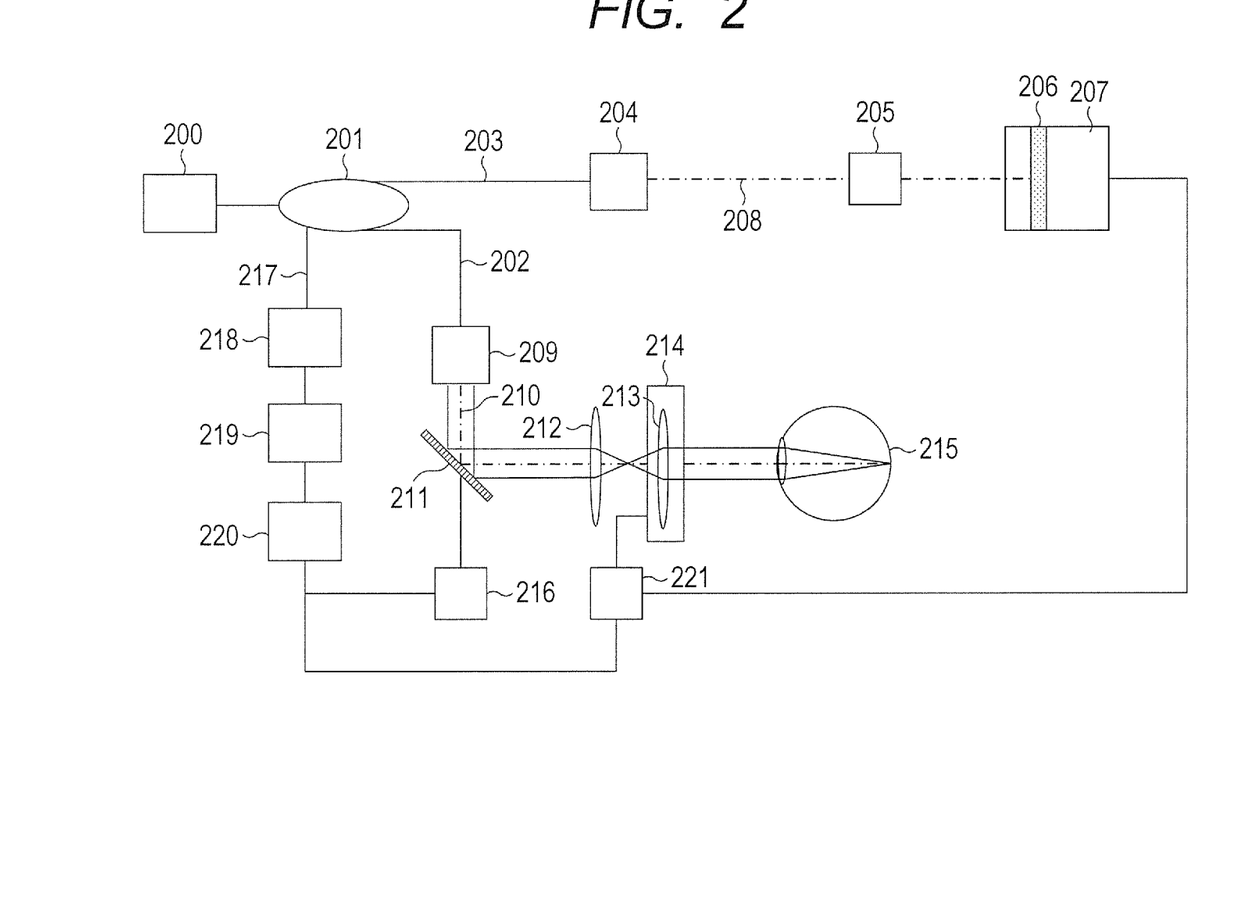
FIG. 2 is an illustration of an optical coherence tomographic imaging apparatus according to the first embodiment, a second embodiment, and a third embodiment of the present invention.

FIG. 2 is a configuration diagram of an OCT apparatus according to an embodiment of the present invention. In FIG. 2, the OCT apparatus includes a light source 200. In this embodiment, a super luminescent diode (SLD) light source is used as the light source 200. However, the light source 200 may be any light source as long as the light source 200 is a low-coherence light source. Specifically, an amplified spontaneous emission (ASE) light source, an ultrashort-pulse light source, such as a titanium-sapphire laser light source and a super continuum (SC) light source, and a swept source (SS) light source may be used.

The OCT apparatus further includes a fiber coupler 201 configured to divide light having a wavelength in a wide band, which is emitted from the light source 200, into reference light passing through a fiber 203 serving as a reference optical path and measuring light passing through a fiber 202 serving as a measurement optical path. It is desired that the fiber coupler 201 have less wavelength dependency with respect to a division ratio between the reference light and the measuring light and have a substantially constant division ratio. The division ratio is set in consideration of reflectance of a tomographic image of an object to be inspected, which is acquired by the OCT apparatus. A retina of a human eye is low in reflectance, and hence it is necessary to reduce a loss of reflected return light to the extent possible. Thus, a coupler having a division ratio of 90:10 may be used, but the present invention is not limited thereto.

The divided measuring light is output as collimated light through a fiber collimator 209. Measuring light 210 output as the collimated light through the fiber collimator 209 irradiates a retina of an eye 215 that is the object to be inspected. Further, the measuring light 210 passes through a scanning optical system constituted by a scanner mirror 211 and a scanner lens 212, for scanning the retina of the eye 215 with the measuring light 210, and then focus adjustment is performed by an objective lens 213. The scanner mirror 211 enables suitable control of scan speed, an image size, and a scan pattern (vertical scan, horizontal scan, circle scan, radial scan, or the like) of the OCT apparatus. The scanner mirror 211 is controlled by a scanner controller 216. The focus adjustment may be implemented by adjusting a position of an electrically-driven stage 214. The electrically-driven stage 214 is controlled by a stage controller 221. The scanner controller 216 and the stage controller 221 are controlled by a PC 220.

The measuring light 210 is reflected on the retina of the eye 215, and travels as measuring return light through the above-mentioned measurement optical path in an opposite direction.

On the other hand, divided reference light 208 is output as collimated light through a fiber collimator 204. For the reference light 208, dispersion compensation is performed by a dispersion compensation member 205, and the resultant reference light 208 is reflected on a reference-system reflection mirror 206. With use of an optical attenuator (not shown), such as an ND filter, a mechanism for adjusting light intensity may be provided between the fiber collimator 204 and the reference-system reflection mirror 206.

Hereinafter, the dispersion compensation is briefly described. Various lenses used in the optical system for the measurement optical path, such as the scanner lens 212 and the objective lens 213, and vitreous body and a crystalline lens of the eye 215 that are the object to be inspected each have such a characteristic that a refractive index thereof differs depending on the wavelength. Such a characteristic is referred to as dispersion. It is generally known that vertical resolution of the OCT apparatus is deteriorated due to the dispersion. When members corresponding to the various lenses and the vitreous body and the crystalline lens of the eye 215 are inserted into the reference optical path, the deterioration in resolution and decrease in interference intensity can be prevented. Such arrangement and operation are referred to as the dispersion compensation.

An electrically-driven stage 207 for adjusting a position of the reference-system reflection mirror 206 has its position controlled by the stage controller 221. The movement of the reference-system reflection mirror 206 using the electrically-driven stage 207 corresponds to movement of a coherence gate. The reference light reflected by the reference-system reflection mirror 206 travels through the above-mentioned reference optical path in an opposite direction. Interference light obtained by combining the measuring return light and the reference light with use of the fiber coupler 201, or combined light, travels through a fiber 217, and the optical path thereof is divided by a beam splitter 218 for each wavelength. For the divided interference light, a photodetector element 219 performs photoelectric conversion for each wavelength, and then the PC 220 including a data acquisition system performs data acquisition, imaging, and analysis. The photodetector element 219 is a line sensor camera, and in a case of a wavelength swept light source such as the SS light source, the beam splitter 218 and the line sensor camera are not used but a photodiode is used as the photodetector element.

A method of imaging data acquired by the photodetector element 219 is described below. The acquired data is evenly spaced with respect to the wavelength. On the other hand, in order to determine a reflection intensity profile with respect to a distance, a Fourier transform is performed with respect to the wavenumber, and hence the data needs to be evenly spaced with respect to the wavenumber. Thus, the data acquired by the photodetector element 219 is subjected to wavelength-wavenumber conversion, to thereby acquire data evenly spaced with respect to the wavenumber. The data is subjected to Fourier transform for each scanning operation, and an absolute value of a complex amplitude thus output is calculated. In order to display the absolute value data as an image, a logarithmic transformation is performed to convert the data into a luminance value of 8-bit grayscale. The luminance value data is matched with positional coordinates of an image, and is output as two-dimensional image data. Through the above-mentioned operation, the tomographic image of the retina or the like that is the object to be inspected is acquired.

Hereinafter, switching of evaluation indices in accordance with an evaluation area is described with reference to FIGS. 1 and 3. FIG. 1 is a flow chart illustrating the first embodiment. FIG. 3 is an illustration of the evaluation area and the evaluation index according to the first embodiment, and the evaluation area and the evaluation index are output on a monitor included in the PC 220 of FIG. 2.

For a subject to be examined for the first time, a subject who undergoes medical examination or the like and therefore has not been diagnosed with his/her illness, or a subject whose illness affects a wide range of the retina displayed in the image, the entire tomographic image needs to be observed. On the other hand, for a subject who has been diagnosed with an illness area, there may be employed an evaluation method in which only the illness area is evaluated. In this case, the entire retina or the illness area (for example, detached area or neovascularized area), which is an anatomical structure to be observed, is set as the evaluation area, and a tomographic image of the evaluation area is acquired. In Step 101, an input section (not shown) included in the PC 220 inputs the evaluation area based on an instruction from the user. As illustrated in FIG. 3, the evaluation area is input by the user through selection of any one of radio buttons labeled as "retina" or "illness area" with a device such as a mouse (hereinafter, referred to also as "setting of imaging parameter" or "imaging parameter setting step"). The input section functions as an evaluation area setting unit for setting the evaluation area. The input section and related components of the PC 220 serve as an imaging parameter setting unit according to the present invention. When the evaluation area is set by the user, an evaluation index (image quality evaluation index) in accordance with the evaluation area, that is, the imaging parameter, is selected by the PC (Step 102: evaluation index selecting step). The components of the PC 220 for performing the above-mentioned operation correspond to an evaluation index selection unit according to the present invention. In a case where the evaluation index in accordance with the evaluation area is selected from among a plurality of evaluation indices, the user may select the evaluation index.

Figure 3:
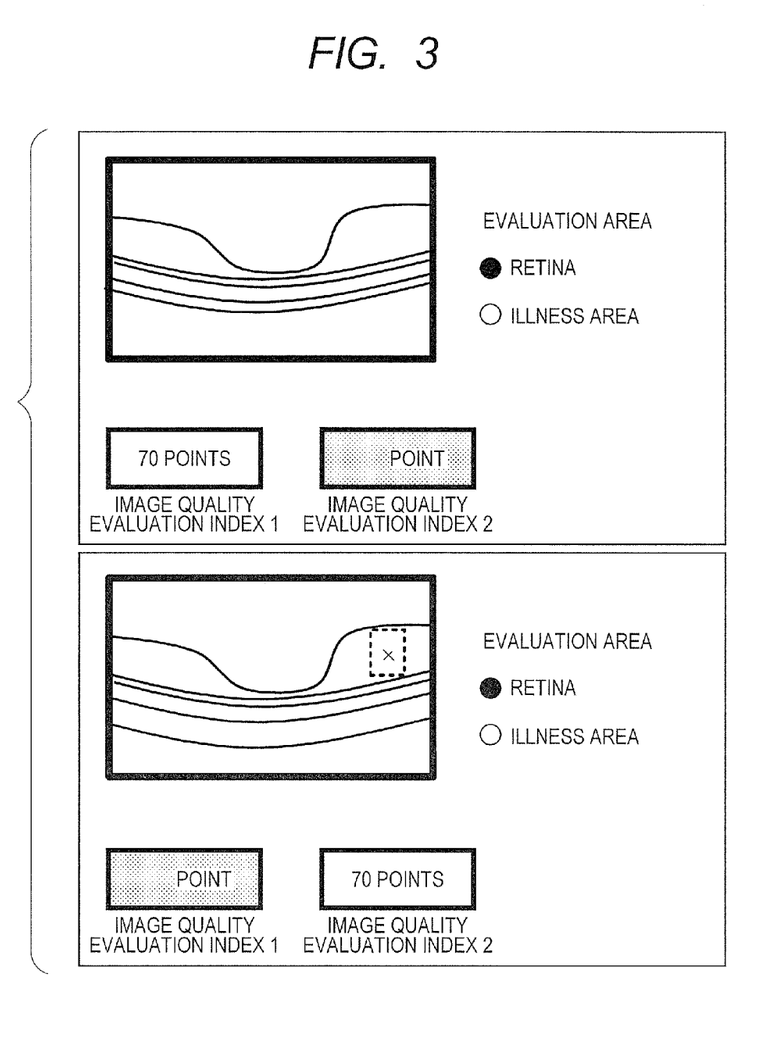
FIG. 3 is an illustration of an evaluation area according to the first embodiment.

FIG. 3 is an illustration of display screens showing the setting of the evaluation area and an evaluation result, which are displayed on the monitor of the PC 220. The upper part of FIG. 3 is a display example in a case where the entire image ("retina") is set, and the lower part of FIG. 3 is a display example in a case where part of the image ("illness area") is set.

The input section (not shown) included in the PC selects an image quality evaluation index in accordance with the imaging parameter that is set based on an instruction from the user. Specifically, as illustrated in the upper part of FIG. 3, in the case where the entire retinal image is observed as the evaluation area, the PC 220 selects an image quality evaluation index "1". On the other hand, as illustrated in the lower part of FIG. 3, in the case where only the illness area is set as the evaluation area, the PC 220 selects an image quality evaluation index "2". That is, the PC 220 serving as the imaging parameter setting unit according to the present invention performs an operation of selecting, as the imaging parameter, whether to set the entire acquired image or part of the acquired image as the evaluation area.

The input section (not shown) included in the PC acquires a tomographic image of the retina so as to include the evaluation area based on an instruction from the user (Step 103). The tomographic image may be acquired with use of the OCT apparatus and the data imaging method as described above. The PC 220 or the user sets an evaluation index calculation area based on the acquired image (Step 104). In the case where the entire retinal image is observed, the PC 220 sets the entire image as the evaluation index calculation area. On the other hand, in the case where the illness area is set as the evaluation area, the PC 220 or the user sets an evaluation index calculation area surrounded by, for example, the dotted line. Such setting of the evaluation area is executed by the components of the PC 220 that function as the evaluation area setting unit. The PC 220 acquires an image characteristic amount based on the evaluation index calculation area (Step 105: image characteristic amount acquiring step). A program module for executing Steps 103 to 105 functions as an image characteristic amount acquiring unit.

In this embodiment, a histogram, a luminance value distribution, or the like is used as the image characteristic amount. For the image quality evaluation index "1", for example, the following expressions are used under a condition that the entire image is set as the evaluation index calculation area.

$$IQI1 = Cont \times TSR \quad \text{(Expression 2.1)}$$

$$Cont = (saturation - noise)/2^{BitDepth} \quad \text{(Expression 2.2)}$$

$$TSR = (\text{Number}(saturation \sim middle)/\text{Number}(middle \sim noise)) \quad \text{(Expression 2.3)}$$

where "BitDepth" represents a bit depth of the image, "saturation" represents a value of the 99th percentile of the histogram, "noise" represents a value expressed by ((minimum luminance value of tomographic image of retina)−1), and "middle" represents an average value between "saturation" and "noise". "Number(saturation-middle)" represents the total number of pixels having a luminance value in a range of from "saturation" to "middle" in the histogram. "Cont" is a term corresponding to a contrast of the tomographic image of the retina, and "TSR" represents a ratio of the number of pixels in a bright layer to the number of pixels in a dark layer in the tomographic image of the retina.

However, the image quality evaluation index "1" is not limited to the "IQI1".

Further, as described above, it is preferred that the image characteristic amount be represented by the histogram, but for example, the image characteristic amount may be represented by a value of a so-called median point obtained based on the histogram. Further, the histogram also corresponds to a signal value obtained from each evaluation area in the tomographic image, such as the luminance value, or an occurrence frequency of a value that is equal to or larger than the signal value.

Next, the image quality evaluation index "2" to be selected in the case where the illness area is set as the evaluation area is described.

The evaluation index calculation area is defined as an area of an arbitrary size including the illness area. The user may set the evaluation index calculation area as a layered structure of the displayed tomographic image, or alternatively the PC 220 or the user may set the evaluation index calculation area as a rectangular enclosure area in the vicinity of the illness area. In the lower part of FIG. 3, the evaluation index calculation area is set as the rectangular area.

In a case where a plurality of layers (specifically, external nuclear layer and external limiting membrane layer) are present in the evaluation area, there may be employed an evaluation index using a contrast difference between the bright layer and the dark layer or an SNR. The image characteristic amount is represented by the luminance value, the luminance value distribution, or the like. Further, there may be employed a method in which the image quality evaluation is performed based on the degree of divergence from a histogram shape in an area of a previously acquired image, which has the same size and is situated at the same position. The image characteristic amount is represented by the histogram, and in this case, in order to compare the current and previous images, the same area is imaged using a tracking function or a unit for storing areas imaged by a fundus camera or the like. Further, the same evaluation index calculation area as that in the previous image is set, and the current and previous histograms are compared. It is only necessary that the degree of divergence be used for the image quality evaluation index with the previous histogram set as a reference histogram. Specifically, there is a method in which cumulative histograms are determined based on the histograms, and the slopes of the cumulative histograms are compared for indexing. Further, the evaluation index may be a combination of the above-mentioned evaluation indices, and this combination of the evaluation indices may be used for a plurality of independent evaluation indices.

By the above-mentioned method, the image quality is evaluated based on the evaluation index and the image characteristic amount (Step 106). The image quality evaluation performed in Step 106 is executed by a program module provided in the PC 220, which functions as an image quality evaluating unit. After that, the PC 220 illustrated in FIG. 2 stores identification information of the subject, the acquired image, the selected evaluation index, and the evaluation result. The evaluation index for evaluating the image quality under the condition in which the entire retinal image is set as an evaluation target, and the evaluation index for evaluating the image quality under the condition in which only a specific part of the retinal image is set as an evaluation target are switched in accordance with the evaluation area, and thus the image quality evaluation can be performed with higher accuracy.

Second Embodiment

A second embodiment of the present invention is described with reference to FIGS. 4 to 6. Note that, in the following embodiment, the optical coherence tomographic imaging apparatus is identical with that of the first embodiment, and therefore description thereof is omitted.

Figure 4:
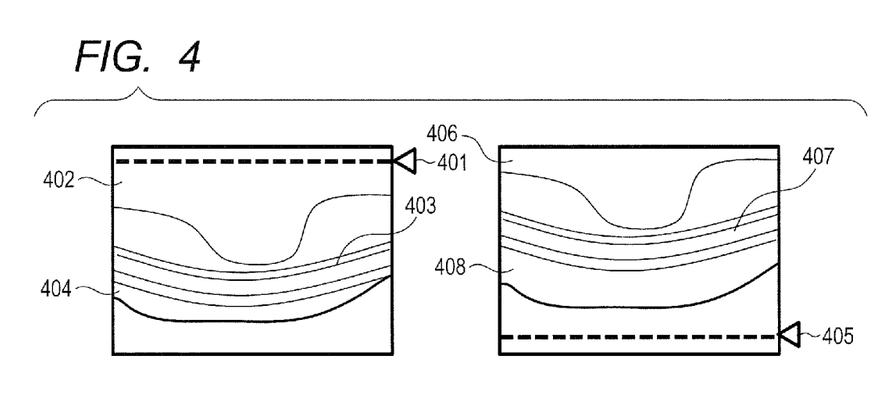
FIG. 4 is an illustration of normal imaging and EDI according to the second embodiment.

FIG. 4 is an illustration of normal imaging and EDI as methods of measurement for the object to be inspected. The normal imaging and the EDI are distinguished from each other based on whether the coherence gate is situated at a position 401 above an object to be inspected 403 or a position 405 below an object to be inspected 407. A distance from the fiber coupler 201 to the object to be inspected 403 or 407 in the measurement optical system (measurement optical system distance) is compared to a distance from the fiber coupler 201 to the reference-system reflection mirror 206 in the reference optical system (reference optical system distance, or reference optical path length). The normal imaging corresponds to a case where the measurement optical system distance is larger, and the EDI corresponds to a case where the reference optical system distance is larger. The left side of FIG. 4 corresponds to the normal imaging, and the right side of FIG. 4 corresponds to the EDI. At the coherence gate, the tomographic image is folded. As a result, images overlap one on top of another. The overlapping images cannot be separated from each other, and hence the coherence gate needs to be set at a position distant from an observation area in the tomographic image of the object to be inspected.

The FD-OCT apparatus has such a characteristic that the sensitivity near the coherence gate is higher (roll-off characteristic). From the clinical point of view in which the OCT apparatus is used for diagnosing the retina, the EDI is mainly used for focused observation on a lower area of the retina, such as the choroid. The normal imaging is set as default. In the normal imaging, a lower area of a choroid 404 may be lost. On the other hand, in the EDI, a choroid 408 is imaged in a wider range because the choroid 408 is near the coherence gate. However, there is such a disadvantage that, when observed, a relatively bright layer, such as a nerve fiber layer (NFL) or a retinal ganglion cell complex (GCC) layer, which is situated at an upper portion of the retina and is distant from the coherence gate, is darker as compared to the normal imaging due to decrease in sensitivity caused by the roll-off effect.

Figure 5:
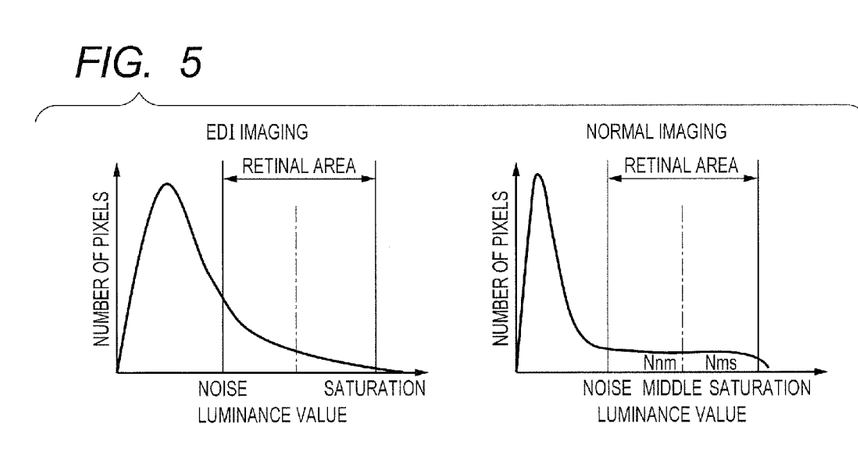
FIG. 5 is an illustration of histograms acquired in the normal imaging and the EDI according to the second embodiment.
Figure 6:
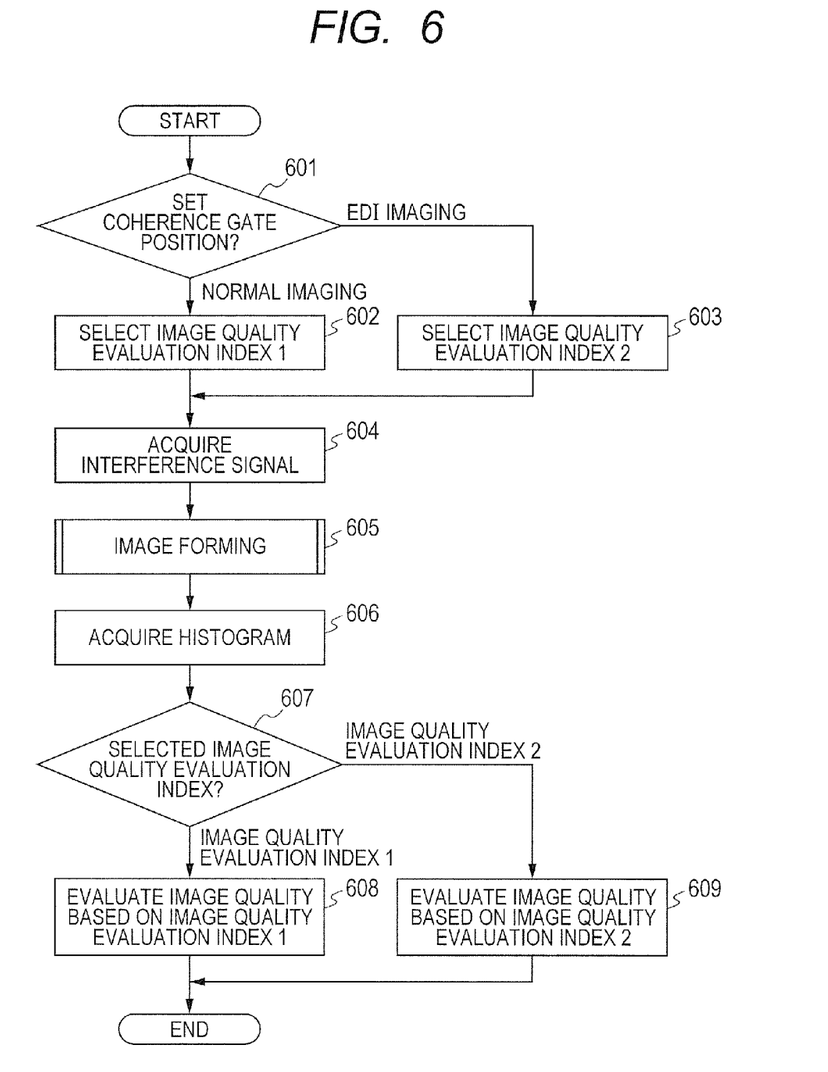
FIG. 6 is a flow chart illustrating the second embodiment.

FIG. 5 is an illustration of a representative example of histograms in the retinal area imaged in the normal imaging and the EDI. FIG. 5 shows that the EDI is larger than the normal imaging in number of pixels having a low luminance value. This fact is caused by, as described above, the difference in visibility among the choroid, the NFL, and the GCC layer.

In this embodiment, the image quality evaluation indices are switched in accordance with the imaging parameter (whether to select the normal imaging or the EDI). The switching is described with reference to FIG. 6. The setting of the imaging parameter in this embodiment corresponds to the setting of the imaging method, that is, the normal imaging or the EDI (Step 601). In this case, the switching between the normal imaging and the EDI involves shift of the coherence gate through the above-mentioned change of the reference optical path length, and hence the imaging parameter includes the change or selection of the reference optical path length. The imaging parameter is set by the user. For example, in the normal imaging, the evaluation area corresponds to the entire tomographic image of the retina, and in the EDI, the evaluation area corresponds to the choroid area.

Hereinafter, the selection of the image quality evaluation index in the normal imaging and the EDI (Steps 602 and 603) is described. Note that, the image quality evaluation index is not limited to the image quality evaluation index described in this embodiment, and various image quality evaluation indices may be employed so as to meet the purpose of imaging.

In the normal imaging, the evaluation area corresponds to the entire retinal image, and hence, for the image quality evaluation index "1", the "IQI1" of the first embodiment is used.

On the other hand, the EDI is intended for focused observation on the choroid in the tomographic image of the retina, and hence, for the image quality evaluation index "2" (image quality index 2: hereinafter, referred to as "IQI2"), the following index is used.

$$IQI2 = \text{Cont} \times \text{Skew} \quad \text{(Expression 3)}$$

where "Skew" represents a three-dimensional moment of the histogram indicating skewness of the retinal area in the histogram. As the value of the "Skew" is larger, the skewness of the histogram is larger in the retinal area of the tomographic image (the shape of the histogram deviates from the normal distribution). As the choroid layer that is the dark layer is observed more clearly, the histogram exhibits a larger number of pixels having a low luminance value, and hence the skewness increases.

In the above-mentioned manner, the PC 220 selects the image quality evaluation index in each of the normal imaging and the EDI. In a case where the evaluation index in accordance with the evaluation area is selected from among a plurality of evaluation indices, the user may select the evaluation index. After that, an interference signal is acquired (Step 604), and the PC 220 forms an image (Step 605).

The evaluation index calculation area is set as the entire image in both the normal imaging and the EDI. In the EDI, the evaluation index calculation area is set wider to the entire image instead of the evaluation area corresponding to the choroid, with the result that evaluation focusing only on the dark area can be performed with high accuracy. A histogram is acquired as the image characteristic amount from the acquired image (Step 606), and in accordance with the selected image quality evaluation index (Step 607), the image quality evaluation is performed based on the above-mentioned histogram (Step 608 or 609). The image quality evaluation indices are switched depending on the purpose of imaging, and thus the image quality evaluation applicable to more accurate diagnosis can be performed. Also in a case of other imaging parameters (for example, scan pattern, image resolution, number of overlapping images, and imaging speed), a suitable image quality evaluation index may be set through the switching in accordance with the imaging parameter.

Third Embodiment

Figure 7:
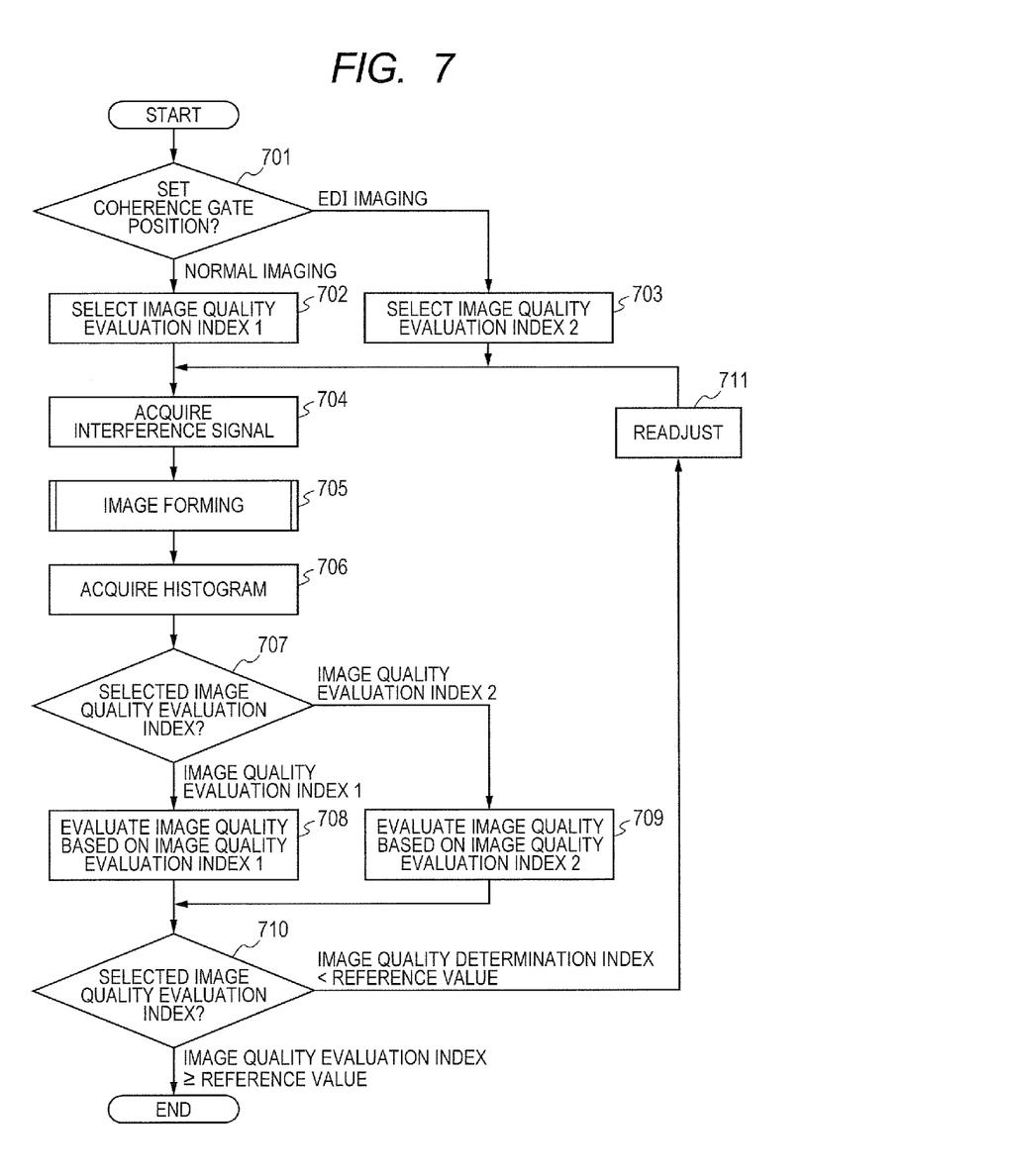
FIG. 7 is a flow chart illustrating the third embodiment.

A third embodiment of the present invention is described with reference to FIG. 7. This embodiment is based on the second embodiment. In order to obtain a satisfactory result of the evaluation using the image quality evaluation index so as to enhance the image quality, in this embodiment, there is provided a feedback configuration for the OCT apparatus, which employs an image quality evaluation index and a reference value.

Whether to perform the feedback is determined based on whether or not the image quality evaluation index exceeds the reference value (Step 710). The feedback is performed when it is determined that the image quality evaluation index does not exceed the reference value. In the condition of Step 710, when the image quality evaluation index does not exceed the reference value, readjustment (Step 711) is performed before the acquisition of the interference signal. This operation is executed by the components of the PC 220 that function as a readjustment unit. After the readjustment in Step 711, the PC 220 forms an image and determines a histogram in Steps 704 to 706 in a manner similar to the above. After that, in accordance with the selected image quality evaluation index (Step 707), the image quality evaluation is performed based on the above-mentioned histogram (Step 708 or 709). After that, the operation proceeds to Step 710, in which the result of the evaluation using the image quality evaluation index is compared to the reference value, and when the image quality evaluation index exceeds the reference value, the operation is finished.

When the value of the "IQI1" in the normal imaging is low, the following reasons are conceivable as an example.

The contrast of the tomographic image of the retina is low.

The position of the coherence gate is distant from the retinal image.

Therefore, as the readjustment, focus adjustment or adjustment of the position of the coherence gate is performed, and thus a satisfactory result of the image quality evaluation can be obtained. With the "IQI1" and the feedback configuration, the luminance value and contrast of the entire tomographic image of the retina can be increased. Specifically, a histogram obtained in a case of unsatisfactory imaging for the tomographic image of the retina exhibits a symmetric distribution with a small distribution width across a peak value. As the readjustment, focus adjustment (corresponding to movement of the objective lens 213 of FIG. 2) or reflectance adjustment (adjustment of the optical attenuator (not shown), such as an ND filter, between the fiber collimator 204 and the reference-system reflection mirror 206) is performed, and thus the value of the "Cont" part of the "IQI1" is mainly increased, with the result that the image quality is enhanced and the value of the image quality evaluation index "IQI1" is increased. Further, the position of the reference-system reflection mirror 206 is adjusted so as to bring the position of the coherence gate closer to the layer area of the tomographic image of the retina to the extent that the coherence gate is not situated thereon. As a result, the decrease in sensitivity caused by the roll-off can be prevented. Note that, the above-mentioned operations are identical with the adjustment performed to some extent before the acquisition of the interference signal in Step 704 and the readjustment in Step 711 of FIG. 7, and are fine adjustment performed in consideration of the selected image quality evaluation index and the image quality evaluation.

As a result, the NFL and the GCC layer that are the bright layers near the coherence gate become brighter. Further, the image quality is enhanced and the value of the "IQI1" is increased along with the increase in values of the "Cont" and "TSR".

When the value of the "IQI2" in the EDI focusing on the choroid layer is low, the following reasons are conceivable as an example.

The contrast of the tomographic image of the retina is low.

The choroid layer is distant from the coherence gate, or the coherence gate is situated on the choroid layer so that the image is folded in the choroid area.

Therefore, as the feedback configuration, the readjustment, such as focus adjustment or adjustment of the position of the coherence gate, is performed, and thus the choroid layer can be observed with higher accuracy for the thickness and luminance distribution. In the EDI intended for imaging of the choroid, the choroid layer can be imaged with high precision when using the image quality evaluation index and feedback configuration suitable for the EDI, with the result that the image quality of the tomographic image of the retina is enhanced.

As described above, according to this embodiment, in the case of the unsatisfactory result of the evaluation, appropriate readjustment can further be performed in accordance with the imaging parameter.

Other Embodiments

Further, the present invention is also implemented by executing the following processing. Specifically, in this processing, software (program) for implementing the functions of the above-mentioned embodiments is supplied to a system or an apparatus via a network or various kinds of storage medium, and a computer (or CPU, MPU, etc.) of the system or the apparatus reads and executes the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-143919, filed Jun. 29, 2011, which is hereby incorporated by reference herein in its entirety.

What is claimed is:

1. An ophthalmologic apparatus for evaluating a tomographic image of an object to be inspected, the tomographic image being obtained based on combined light of return light from the object to be inspected and reference light, the return light being obtained by irradiating the object to be inspected with measuring light, the reference light corresponding to the measuring light, the ophthalmologic apparatus comprising:
a selection unit configured to select an evaluation method based on a position of a coherence gate, among a plurality of evaluation methods; and
an evaluating unit configured to evaluate the tomographic image based on the evaluation method selected by the selection unit.

2. An ophthalmologic apparatus according to claim 1, wherein the evaluation unit evaluates the image quality of the tomographic image.

3. An ophthalmologic apparatus according to claim 1, wherein the object to be inspected is a fundus of an eye, and the selection unit selects the evaluation method based on a position of the coherence gate with respect to the fundus of the eye.

4. An ophthalmologic apparatus according to claim 3, wherein the selection unit selects a first evaluation method when the coherence gate is nearer a light source of the measuring light than a layer to be inspected in the fundus, and selects a second evaluation method different from the first evaluation method when the layer to be inspected is nearer than the coherence gate.

5. An ophthalmologic apparatus according to claim 4, wherein the first evaluation method uses a ratio of a number of pixels in the tomographic image whose brightness value is higher than or equal to a predetermined value, to a number of pixels whose brightness value is lower than the predetermined value, and the second evaluation method does not use the ratio.

6. An ophthalmologic apparatus according to claim 4, wherein the first evaluation method uses a ratio of a number of pixels in the tomographic image whose brightness value is higher than or equal to a predetermined value, to a number of pixels whose brightness value is lower than the predetermined value, and the second evaluation method uses a distortion of a histogram of the tomographic image.

7. An ophthalmologic apparatus according to claim 1, wherein the coherence gate is located at a position where an optical path length of the measuring light is coincident with an optical path length of the reference light.

8. A method of evaluating a tomographic image of an object to be inspected, the tomographic image being obtained based on combined light of return light from the object to be inspected and reference light, the return light being obtained by irradiating the object to be inspected with the measuring light, the reference light corresponding to the measuring light, the method comprising the steps of:
selecting with a processor an evaluation method based on a position of a coherence gate, among a plurality of evaluation methods; and
evaluating with a processor the tomographic image based on the evaluation method selected by the selecting step.

9. A non-transitory computer-readable storage medium having recorded thereon a program for causing a computer to perform the steps of the evaluating method according to claim 8.

10. An ophthalmologic apparatus according to claim 1, further comprising an adjustment unit configured to adjust imaging for the tomographic image based on an evaluation result of the evaluation unit.

11. An ophthalmologic apparatus according to claim 10, wherein the adjustment unit adjusts the position of the coherence gate.

12. An ophthalmologic apparatus according to claim 10, wherein the adjustment unit performs a focus adjustment.

* * * * *